US007869469B1

(12) United States Patent
Spuler (10) Patent No.: US 7,869,469 B1
(45) Date of Patent: Jan. 11, 2011

(54) RAMAN CELL FOR HIGH POWER APPLICATIONS

(75) Inventor: Scott Spuler, Westminster, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 11/140,588

(22) Filed: May 27, 2005

Related U.S. Application Data (63) Continuation-in-part of application No. 10/804,863, filed on Mar. 19, 2004, now Pat. No. 7,583,364.

(51) Int. Cl.
*H01S 3/30* (2006.01)
(52) U.S. Cl. .............................. 372/3; 372/70; 359/327
(58) Field of Classification Search .................... 372/3, 372/70; 359/327
See application file for complete search history.

(56) References Cited

U.S. PATENT DOCUMENTS

| | | | | | |
|---|---|---|---|---|---|
| 4,858,238 | A | * | 8/1989 | Cardimona | 372/3 |
| H0742 | H | * | 2/1990 | Bobbs et al. | 359/327 |
| 4,922,495 | A | * | 5/1990 | Bobbs et al. | 372/3 |
| 4,993,031 | A | * | 2/1991 | White, III | 372/3 |
| 5,110,204 | A | * | 5/1992 | Miles et al. | 356/28 |
| 5,241,315 | A | | 8/1993 | Spinhirne | 342/54 |
| 5,475,527 | A | * | 12/1995 | Hackel et al. | 359/334 |
| 5,504,765 | A | * | 4/1996 | Miyamoto et al. | 372/35 |
| 5,721,748 | A | * | 2/1998 | Injeyan et al. | 372/3 |
| 5,796,761 | A | * | 8/1998 | Injeyan et al. | 372/3 |
| 6,373,869 | B1 | * | 4/2002 | Jacob | 372/22 |
| 6,667,830 | B1 | * | 12/2003 | Iketaki et al. | 359/368 |
| 6,747,735 | B2 | * | 6/2004 | Chen et al. | 356/301 |
| 6,958,854 | B1 | * | 10/2005 | Merriam | 359/327 |
| 2003/0016350 | A1 | | 1/2003 | Cheng et al. | 356/301 |

FOREIGN PATENT DOCUMENTS

WO      WO93/26067      * 12/1993

OTHER PUBLICATIONS

Mayor et al "NCAR's New Raman-Shifted Eye-Safe Aerosol Lidar (REAL)" Atmospheric Technology Division, National Center for Atmospheric Research, Boulder, Colorado, Oct. 2003.*

(Continued)

*Primary Examiner*—Minsun Harvey
*Assistant Examiner*—Yuanda Zhang
(74) *Attorney, Agent, or Firm*—Marsh Fischmann & Breyfogle LLP (57) ABSTRACT

A Raman shifter is provided with improved optical efficiency and robustness, particularly for high power applications. In one embodiment, a source system (100) includes a source pump laser (102) and a seed laser (104). Beams from the pump laser (102) and seed laser (104) combine for transmission into a Raman cell (112). Folding optics define a multipass pathway through the Raman cell (112). Such folding optics may include an internal reflectance element. An entry window into the Raman cell, an exit window from the Raman cell, and the internal reflectance elements include surfaces disposed at a Brewster angle relative to the incident beam. The Raman cell medium is circulated in a direction transverse to the beam pathways through the cell. In this manner, improved optical efficiency and robustness is achieved as well as improved performance over a significant wavelength band.

19 Claims, 6 Drawing Sheets

OTHER PUBLICATIONS

Paper entitled "Counterproliferation Long Range Biological Standoff Detection System" limited distribution, U.S. Army Soldier and Biological Chemical Command, Aberdeen Proving Ground, MD, Rev. Apr. 26, 2000.

News Release, Contract No. 283-95, Office of Assistant Secretary of Defense (Public Affairs), Washington, D.C., May 23, 1995. http://www.defenselink.mil/news/May1995/c052395_ct283-95.h.

Paper reprinted from the Proceedings of the International Conference on Lasers '97entitled "Generation of 1.54 µm Radiation With Application to an Eye-Safe Laser Lidar" authored by N. A. Kurnit.R. F. Harrison, R. R. Karl, Jr., J. P. Brucker, J. Busse, W. K. Grace, O. G. Peterson and W. Baird of the Los Alamos National Laboratory, Los Alamo, NM, and W. S. Hungate of the U.S. Army CBDCOM, Aberdeen Proving Ground, MD., pp. 608-610.

Datasheet titled "C30659E-900-1060-1550 nm Series Silicon and InGaAs APD Preamplifier Modules", www.perkinelmer.com/optoelectronics, pp. 1-9.

Paper entitled "M-Squared Laser Beam and Telescope Overlap Factors for a 1.55 micron KTP OPO Lidar," by Priyavadan Mamidipudi and Dennis Killinger, Dept. of Physics, Univ. of So. Fla., Tampa, Florida, pp. 837-840.

Paper entitled "Optimal Detector Selection for a 1.5 micron KTP OPO Atmospheric Lidar," by Priyavadan Mamidipudi and Dennis Killinger, Univ. of So. Fla., Tampa, Florida, part of the PIE Conference on Laser Radar Technology and Applications IV, Orlando, Florida, Apr. 1999 |SPIE vol. 3707-0277-786X/99|, pp. 327-335.

Paper entitled "High-Energy, Eyesafe Lidar for Long-Range, High-Resolution Aerosol Detection" [NASA Langley Phase II SBIR, Contract NASI-20476], pp. 1-5, Mar. 8, 2002.

Paper entitled "Boundary Layer Height Measurements with an Eyesafe LIDAR," by G.G. Gimmestad, E.M. Patterson, D.W. Roberts and S.C. Gimmestad, Electro-optics, Environment and Materials Laboratory, Georgia Tech Research Institute, Georgia Institute of Technology, Atlanta, Georgia, SPIE vol. 2112, pp. 187-193.

Article entitled "A Powerful Eyesafe Infrared Aerosol LIDAR: Application of Stimulated Raman Backscattering of 1.06 µm Radiation," W. Carmuth and T. Tricki, Rev. Sci. Instrum. 65 (11), Nov. 1994, copyright 1994 American Institute of Physics.

Applied Optics, vol. 28, No. 23, Dec. 1, 1989, pp. 4978-4981, article "Initial Measurements using a 1.54- µm Eyesafe Raman Shifted Lidar," Edward M. Patterson, David W. Roberts and Gary G. Gimmestad, Georgia Institute of Technology, Atlanta, Georgia.

Paper entitled "Compact, Ruggedized Eyesafe Laser Transmitter," J.C. McCarthy, P.A. Ketteridge, R. Day, Ian Lee and Evan Chicklis, pp. 617, 618.

Lidar Remote Sensing for Industry and Environment Monitoring II, Upendra N. Singh, Editor. Proceedings of SPIE vol. 4484 (2002) copyright SPIE: "Design Validation of an Eye-Safe Scanning Aerosol War with the Center for Lidar and Atmospheric Sciences Students (Class) at Hampton University," by Dale A. Richter, N. Scott Higdon, Patrick Ponsardin and David Sanchez, Itt Industries, Albuquerque, NM and Tomas H. Chyba, Doyle A. Temple, Wei Gong, Russell Battle, Mika Edmondson, Anne Futrell, David Harper, Linoln Haughton, Demetra Johnson, Kyle Lewis and Renee S. Payne-Battott, Center for Lidar and Atmospheric Sciences Students, Hampton University, Hampton, VA.

Applied Optics, May 20, 1997, vol. 36, No. 15: "Aerosol and cloud backscatter at 1.06, 1.54 and 0.53 µm by airborne hard-target-calibrated Nd:YAG/methane Raman lidar," by James D. Spinhirne, S. Chudamani, John F. Cavanaugh andack L. Button, pp. 3475-3490, copyright 1997 Optical Society of America.

Optical Engineering, vol. 35 No. 12, Dec. 1996, pp. 3579-3584: "Comparison of Raman and degenerated optical parametric oscillators for a high-energy and high-repetition-rate eye-safe laser," by Gilles Roy and Pierre Mathieu.

"Atmospheric Laser Radar Measurements Using Two Novel, Eye-Safe Infrared Optical Arametric Oscillators," a dissertatior submitted by Sarah Rhodes Harrell, Dec. 1995, Departments of Physics and Electrical Engineering, University of South Florida.

Report entitled "Final Report on High-Energy, Eyesafe Lidar for Long-Range, High-Resolution Aerosol Detection." Prepared for NASA Langley Research Center, Hampton VA. Contract: NASI-20476 (Phase II SBIR). Reporting Period: Mar. 22, 1995-Dec. 31, 1997. Report prepared by: Schwartz Electro-Optics, Inc., Research Division, Bedford MA.

\* cited by examiner

RAMAN CELL FOR HIGH POWER APPLICATIONS

RELATED APPLICATIONS

This patent application is a continuation-in-part of U.S. patent application Ser. No. 10/804,863, which was filed on Mar. 19, 2004 now U.S. Pat. No. 7,583,364, and which is entitled "HIGH PULSE-ENERGY, EYE-SAFE LIDAR SYSTEM." The entire disclosure of U.S. patent application Ser. No. 10/804,863 is incorporated herein by reference.

GOVERNMENT SUPPORT

The invention was made with Government support under Cooperative Agreement No. ATM-9820037 awarded by the National Science Foundation. The Government has certain rights in this invention.

FIELD OF THE INVENTION

The present invention relates in general to wavelength shifters for shifting a wavelength of laser radiation and, in particular, to a Raman cell and associated functionality for high optical efficiency wavelength shifting that is particularly apt for high power laser applications.

BACKGROUND OF THE INVENTION

In many cases, it is desired to use a laser beam having a center or nominal wavelength that is determined based on requirements or goals of a particular application environment. For example, it may be desired to generate laser light at the optimal performance band of a detector that is preferred for an application. In other cases, a particular wavelength or wavelength band may be preferred to reduce eye hazards or interference with or from other optical signals. In other cases, it may be desired to analyze absorption or scattering wavelength(s) of interest. Many other examples are possible to illustrate that a wide variety of laser wavelengths are desired for various laser related applications.

Unfortunately, high pulse energy laser light cannot be generated or are not readily available at optimal wavelengths for all applications. Indeed, the highest pulse energy beams can generally only be generated at a number of discrete wavelengths. As a result, wavelength shifters are used for a variety of applications. These shifters receive an input or pump beam having suitable performance characteristics and provide an output beam at a shifted wavelength as desired for the subject application.

One family of wavelength shifters is based on second order non-linear processes and includes optical parametric amplifiers and oscillators (OPAs and OPOs; respectively). These are preferred for many applications because they are in solid state form so they are convenient to use and maintain. However, they generally entail some absorbance and may therefore be damaged, particularly for high power applications (e.g., characterized by high pulse energy).

Because of this, wavelength shifters based on third order non-linear processes including stimulated Raman scattering (SRS) are used for certain applications. For convenience, devices that utilize this third order process are referred to herein as Raman shifters. An illustrative Raman shifter involves illuminating a medium, typically a gas in a cell, using a source pump laser. The intense electric field excites molecular vibrations in the medium and the frequency of scattered radiation (the Stokes output) is shifted by the frequency of those vibrations. In at least one case, a Raman amplifier has been seeded at the shifted wavelength using a visible laser diode to improve efficiency. Various output wavelengths can be achieved via SRS shifting by varying the pump laser and medium.

A number of factors limit the performance of such Raman shifters. First, the output intensity is a function of the interaction length or quantity of the medium illuminated. For a given beam diameter and desired medium pressure (in the case of a gas cell), a significant Raman cell path length may be required to provide the desired output intensity (e.g., if the beam intensity for a short path would cause optical breakdown or sooting), thereby adversely affecting instrument compactness. Although the optical path may be folded within the Raman cell, such folding typically results in path overlap that reduces illumination efficiency.

Moreover, path folding is generally accomplished by using coated optics. Such coatings are subject to damage at high pulse energies and generally have performance characteristics that are highly wavelength dependent. That is, such coatings are generally formed from alternating layers of high and low index of refraction materials where the thicknesses of the layers are selected to optimize performance for a particular wavelength, e.g., a quarter-wave stack. As a result, these optics and the Raman cell may be limited to a narrow wavelength band of applications, for example, on the order of 10 nm or less.

Other difficulties of Raman shifters relate to circulating the medium and cell transmission losses. Improved operating performance generally requires that the medium be circulated so that different portions of the medium are illuminated over time, particularly for high power applications. Achieving suitable circulation further complicates design, particularly for folded path geometries. Moreover, the beam is generally transmitted into and out of the cell containing the medium via windows formed in a cell wall. Such transmission through windows may entail optical losses.

SUMMARY OF THE INVENTION

The present invention is directed to a Raman shifter with improved optical efficiency and robustness, particularly for high power applications. The invention implements a folded path within a Raman cell substantially without beam overlap, thereby improving optical efficiency and avoiding potential problems related to multi-pass illumination of a medium portion. In addition, a folded path can be implemented in accordance with the invention free from coated optics for beam redirection, thereby allowing for improved optical efficiency, reduced susceptibility to damage, and improved operating bandwidth. The invention also allows for improved medium circulation for multi-pass Raman cell implementations. Additionally, the invention provides for improved transmission of a beam through an entry and/or exit window of a cell containing a shifting medium.

In accordance with one aspect of the present invention, a Raman shifter is provided with a folded optical path through a shifting medium substantially without path overlap. As noted above, a folded path geometry is desirable to increase the path length of the source beam through the medium without unduly compromising device compactness. However, conventional geometries involving surface reflectors disposed in the Raman cell result in path overlap near the reflective surfaces. In cases where the incident beam and reflected beam are nearly parallel, as may be desired to preserve the optical density of the reflected beam and to reduce the required size of the Raman cell for a desired multi-pass implementation, such overlap may be substantial.

Accordingly, a Raman shifter constructed in accordance with the present aspect of the invention includes: a first port for admitting, into an interior of the cell, a source beam of radiation having a first nominal wavelength (e.g., a pump laser beam of a desired wavelength and the desired operating parameters); a wavelength shifting region, interior of the cell, containing a medium, wherein the radiation is shifted from the first nominal wavelength to a second nominal wavelength (e.g., the first Stokes wavelength for the source wavelength and the medium under consideration) due to interaction of the source beam with the medium; and folding optics for folding an optical path of the source beam across the wavelength shifting region of the cell substantially free from optical overlap. In this regard, the folding optics structure is operative for receiving the beam via a first optical path section and redirecting the beam onto a second optical path section that is substantially free from spatial overlap with the first path section. Each of the optical path sections is defined by the beam width of that path and a propagation direction. Assuming Gaussian beams, the beam width may be defined in conventional fashion relating to intensity drop-off at the beam shoulders.

The source beam may be of any suitable type and may be operated according to operating parameters desired for the specific application under consideration. However, the invention has particular advantages for high power applications where it may be desired to avoid optical breakdown or damage to the medium by a high power (e.g., condensed diameter, high pulse energy and high pulse repetition frequency) beam. For many applications, the cell will contain a pressurized gas, where the gas is selected together with the source wavelength to provide the desired output beam wavelength. The decreased optical density and increased gain length with a non-overlapping path geometry has advantages for any implementation. Additional advantages are realized in the case of gases such as methane that are susceptible to sooting due to optical degradation, particularly in high power applications.

The folding optics element preferably redirects the optical beam so that there is a spatial offset between the incident and reflected paths at the medium interface, e.g., an offset at least equal to the sum of one-half the incoming beam width and one-half of the reflected beam width. This will generally be the same as the overall beam width (which is generally, though not necessarily, the same for the incident and reflected beams). In this manner, substantially wholly different portions of the medium are illuminated by the beam on the first and second path sections. A corresponding method in accordance with the present invention involves providing a cell containing a medium and passing a beam through the medium via first and second paths, each associated with a beam redirecting element, where the paths are substantially free from overlap.

In accordance with another aspect of the present invention, a Raman shifter includes an internal redirection element for implementing a folded path geometry. Specifically, the internal redirection element redirects a source beam for a multi-pass geometry through the shifting medium, e.g., a gas cell. The redirection element includes an interface surface, where the medium is present on a first side of the interface but is substantially absent on a second side of the surface, and structure, disposed on the second side of the surface, for redirecting the beam. Preferably, such redirecting structure is separated from the surface by a distance substantially greater than the beam wavelength, e.g., greater than the beam width. The structure may redirect the beam more than once such that the exiting beam is substantially parallel to but offset from the incoming beam. In one embodiment, the internal redirection element is a prism. It will be appreciated, however, that one or more surface reflection elements separated from the cell by a window, or other optical elements, may be used in this regard, though perhaps with reduced optical performance. A corresponding method involves redirecting a beam relative to a shifting medium using an internal redirection element.

In accordance with another aspect of the present invention, a Raman shifter is adapted for use across a wide wavelength band. Specifically, the shifter includes a port for admitting, into an interior of a cell, a source beam of radiation having a first nominal wavelength, and optics to redirect the optical beam for a plurality of passes across a wavelength shifting region of the cell where the redirecting optics is operative to redirect beams with an optical efficiency of at least 95% across a wavelength band having a bandwidth of at least 1000 nm. As noted above, folded path configurations in Raman shifters have, heretofore, generally been implemented using coated optics. Among other disadvantages, such coated optics generally have highly wavelength dependent performance characteristics. A Raman shifter in accordance with the current aspect of the present invention has a high optical efficiency over a band of at least 1000 nm and, preferably, across a wavelength band extending across the visible spectrum and, more preferably, from within the ultraviolet spectrum portion of the spectrum into the infrared portion of the spectrum. This can be readily achieved, for example, by using an internal reflectance element such as a prism for beam redirection. A related process involves providing a Raman cell having folding optics, first using the folding optics to redirect a beam having a first nominal wavelength, and second using the folding optics to redirect a beam having a second nominal wavelength, where the second nominal wavelength differs from the first nominal wavelength by at least 1000 nm.

In accordance with another aspect of the present invention, a Raman shifter employing a seed beam is provided. This shifter includes a cell containing a wavelength shifting medium, a pump laser source, a seed laser source, first optics for combining the source laser beam and the seed laser beam into a combined beam and directing the combined beam into the cell, and second optics for substantially removing a component from the combined beam after the combined beam has interacted with a portion of the medium in the cell. The pump laser source transmits a source laser beam having a first nominal wavelength and the seed laser source transmits a seed laser having a second nominal wavelength different than the first nominal wavelength. The second wavelength is preferably substantially equal to a Stokes wavelength of the first wavelength for the medium, for example, the first Stokes wavelength. The second optics preferably removes a component corresponding to a first wavelength from the combined beam. In this manner, the output beam includes substantially only the shifted wavelength component. For example, the Raman shifter may be used to shift a beam from a non eye-safe wavelength to an eye-safe wavelength or otherwise to provide a substantially monochromatic output having a desired wavelength. A corresponding method involves combining a source beam with a seed beam, transmitting the combined beam into a Raman cell, and removing a wavelength component from the combined beam after the combined beam has interacted with at least a portion of the medium contained in the cell.

According to a still further aspect of the present invention, a multi-pass Raman shifter is provided with improved medium circulation. As discussed above, it is desirable, particularly for high power applications, to circulate the shifting medium so as to reduce or substantially avoid multiple illuminations of the same portion of the medium during a short time frame. Such circulation is particularly problematic for folded path or multi-pass Raman cell geometries. A Raman shifter constructed in accordance with the present aspect of the invention includes a cell containing the stimulated Raman scattering medium, optics for defining a folded path through the cell for a laser beam where the folded optical path includes a first path section and a second path section contained substantially within a single plane, and a circulation system for circulating the medium such that the medium flows transverse to a first axis of the first path section at the location of the first path section and transverse to a second axis of the second path section at a location of the second path section. In one implementation, the various sections of a folded path are contained within a single plane and structure is provided for circulating the medium substantially perpendicular to the path sections. In this regard, the circulation system may flow the gas in the plane of the path sections or, more preferably, substantially perpendicular to the plane. The flow rate may be selected in relation to the beam width and the pulse repetition frequency such that multiple successive pulses do not illuminate a particular portion of the medium (i.e., a given portion of the medium is illuminated by no more than a predetermined number—one or more—of pulses). In this manner, reduced optical performance associated with multiple illuminations is reduced or substantially eliminated. A corresponding process in accordance with the present invention involves transmitting a beam through a Raman cell along a folded path including first and second sections that are included in a common plane, and circulating the medium in a direction transverse to the path sections and, preferably, transverse to the common plane.

In accordance with a still further aspect of the present invention, a Raman cell with improved transmission properties is provided. The Raman cell generally includes a cell body for containing the shifting medium, an entry window for allowing transmission of a source beam into the cell, and an exit window for allowing transmission of the shifted beam from the cell. In accordance with the present aspect of the invention, at least one of the entry and exit windows is disposed at a Brewster angle relative to the propagation axis of the associated beam for improved transmission. A corresponding method involves providing a Raman cell including a window for transmission of a beam therethrough and transmitting a beam through the window, wherein the beam is disposed at a Brewster angle relative to a surface of the window.

In accordance with another aspect of the present invention, beam forming optics are used to optimize the performance of a Raman cell. As discussed above, particularly for high power applications employing methane as a shifting medium, significant sooting can occur if a tightly focused beam is employed in the Raman cell. However, it is desirable to employ a beam having a high energy density. It has been found that improved performance can be achieved, in this regard, by forming the beam such that the beam is free from any beam waist within the cell, and has an energy density that is greater, even if only slightly, at the exit window of the cell than at the entrance window. A corresponding system includes: a source for transmitting a source beam; a Raman cell for wavelength shifting the source beam, where the cell has an input port (e.g., an entry window) for receiving the source beam into the cell and an exit port (e.g., an exit window) for transmitting the source beam from the cell; and optics for forming the beam such that the energy density at the exit port is greater than at the input port. For example, the optics may be disposed between the source and the cell and may have an effective focal length that is greater than the distance from the optics to the exit port (measured along the optical path of the beam, which may be folded) and less than infinity.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION

In the following description, the invention is set forth in the context of particular seeded, multi-pass Raman shifted source systems, including a system particularly adapted for transmitting an eye-safe beam. While this is a particularly advantageous implementation of the present invention, it will be appreciated that the invention is not limited to such embodiments or implementations. Rather, various aspects of the invention have broader application for use in a variety of Raman shifter applications.

More specifically, the following discussion begins with a general description of a seeded, multi-pass Raman shifted source system. Thereafter, a particular example is provided in the context of an eye-safe source system that may be used for atmospheric lidar applications.

Figure 1:
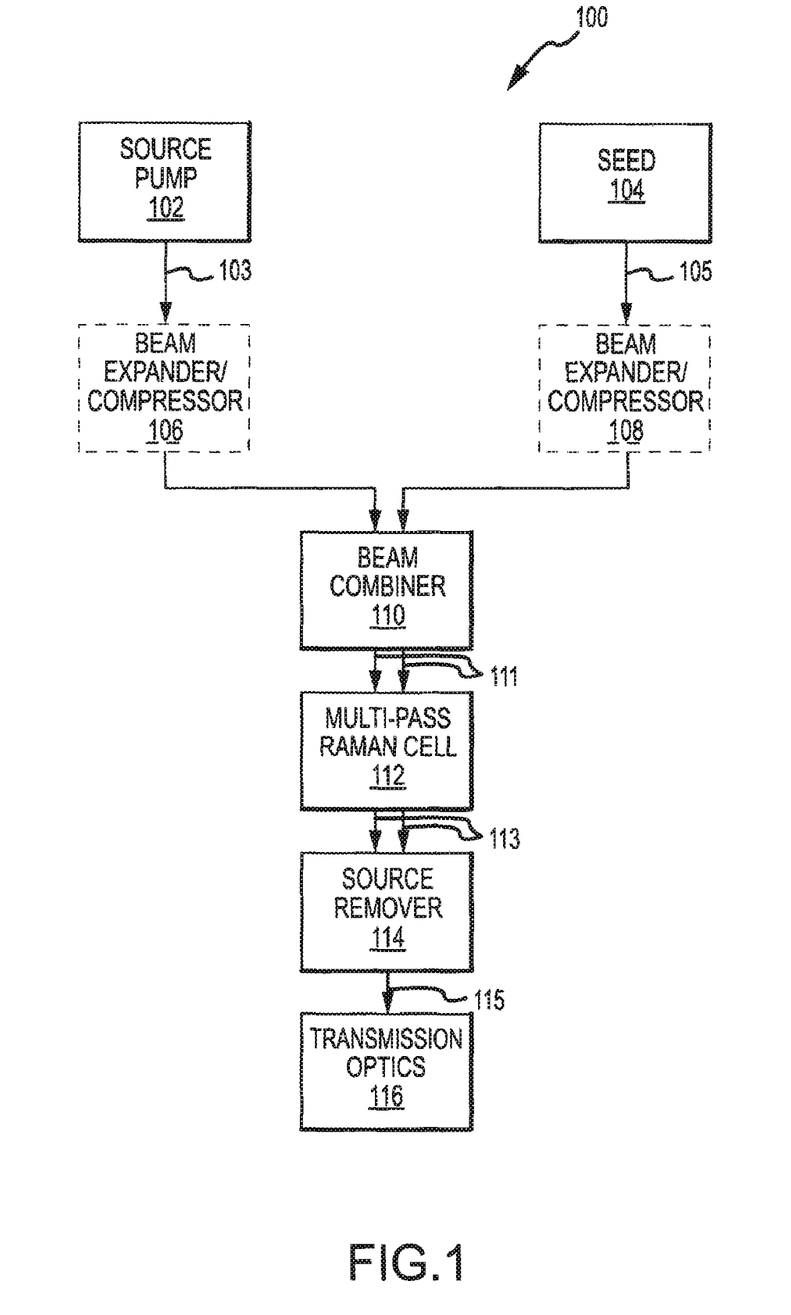
FIG. 1 is a schematic diagram of a Raman shifted source system constructed in accordance with the present invention.

Referring to FIG. 1, a schematic diagram of a Raman shifted source system 100 is illustrated. The illustrated system 100 includes a source pump laser 102 and a seed laser 104. The pump laser 102 provides a source beam 103 having pre-shifted characteristics desired for a particular application. As discussed above, suitable quality lasers are not provided at the specific wavelengths desired for many applications. Accordingly, the system 100 uses a pump laser 102 and the wavelength of the source beam is shifted as will be described below. For example, the pump laser 102 may be a high quality laser that provides a beam that is hazardous to the human eye. The beam may be shifted to a safer wavelength and otherwise processed to meet standards for eye safety.

The seed laser 104 is used to provide a seed beam 105 for seeding the Raman cell, as will be described below, for improved shifting efficiency. In this regard, the seed beam 105 preferably has a wavelength that is substantially equal to a Stokes wavelength of the pump beam 103, for example, a first Stokes wavelength.

It is desirable that the source beam 103 and the seed beam 105 have similar beam widths for improved optical efficiency. In this regard, one or both of the beams 103 and 105 may be expanded or compressed by elements 106 and 108 so that the widths of the beams substantially match. Such compression or expansion may be implemented, for example, using lenses configured as a Galilean telescope. These same or separate optics may be used to provide the desired beam shape or focusing in relation to the Raman cell 112, as will be discussed in more detail below.

The source beam 103 and seed beam 105 are then combined by a beam combiner 110 for transmission into a Raman cell 112. That is, the beams 103 and 105 are preferably superimposed so that they have substantially coincident propagation axes. For example, the beam combiner 110 may comprise coated optics having properties for reflecting the wavelength of the source beam 103 and transmitting the wavelength of the seed beam 105 for coaxial alignment of the beams 103 and 105. The resulting combined beam, identified by arrows 111, is then transmitted to a multi-pass Raman cell 112. As will be described in more detail below, the Raman cell 112 includes a medium, such as a selected, pressurized gas, and optics for defining a folded pathway through the medium. The cell 112 is operative to shift the wavelength of a significant portion of the source beam 103 to the first Stokes wavelength thereof for the given medium. In the illustrated implementation, the shifted wavelength is substantially the same as the wavelength of the seed beam 105.

The exiting beam, identified by arrows 113, therefore generally includes components at the pump wavelength and at the seed wavelength, though with substantial intensity at the seed wavelength due to the wavelength shifting function of the cell 112. In order to provide an output having only the wavelength shifted component, as may be desired, a source remover 114 is utilized to remove the source wavelength. For example, the source remover 114 may include a prism, diffraction grating, or other optics with wavelength dependent characteristics to separate the wavelength components. The undesired component can then be absorbed by a black box or the like. The resulting beam 115 is therefore a substantially monochromatic beam at the shifted wavelength. The beam 115 is then provided to transmission optics 116 which impart the desired optical characteristics to the beam 115. For example, the transmission optics may include a beam expander, a beam compressor, a lens, a mirror, or the like.

Figure 2:
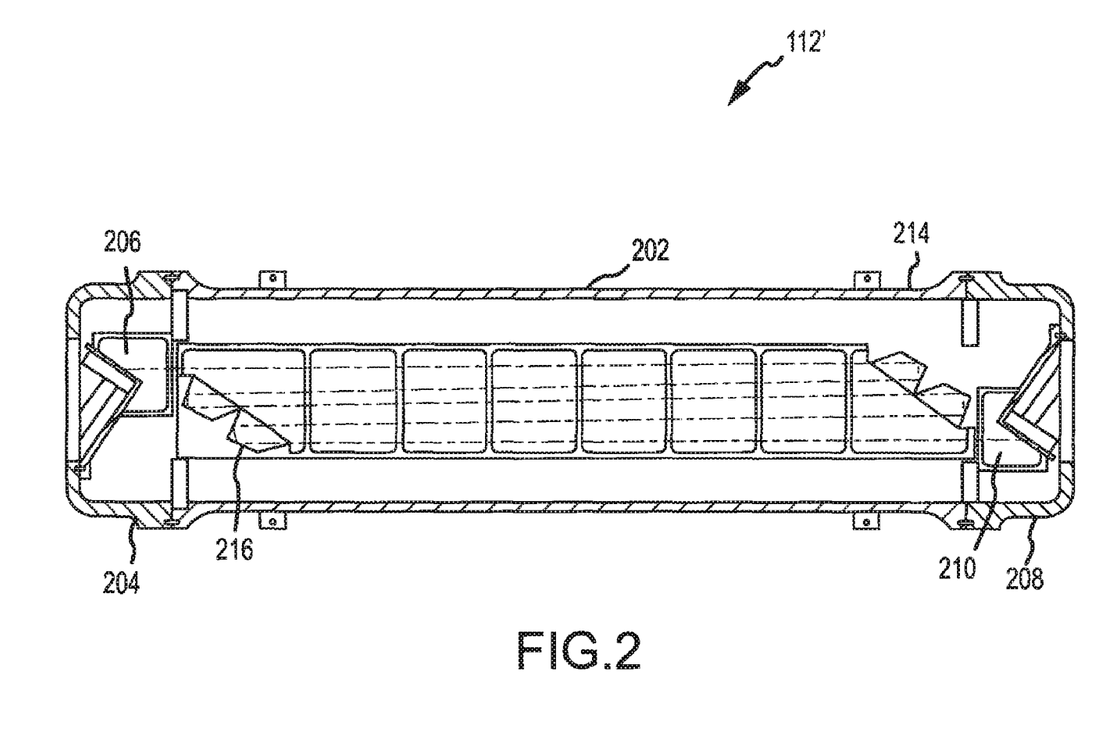
FIG. 2 is side view of a Raman cell for use in the source system of FIG. 1.

FIG. 2 illustrates one embodiment of the multi-pass Raman cell identified by the reference number 112'. The cell 112' generally includes a body 202 with end caps 204 and 208 for containing the shifting medium. An entry window 206 is mounted in the end cap 204 to allow for transmission of the combined beams (the source beam and seed beam) into the cell 112'. The window 206 may be formed from fused silica and is preferably disposed at a Brewster angle relative to the axis of the combined beam for optimum beam transmission. A folded pathway through the cell 112 is defined by internal reflectance elements such as prisms, mounted in mounts 214 and 216. The internal reflectance elements may be formed from fused silica and are constructed for near 100% reflectance across a broad wavelength range. Preferably, the elements provide at least 95% reflectance over a wavelength range of at least 100 nm . . . so at to provide significant operational flexibility. More preferably, the elements provide at least 95% reflectance across the entire visible spectrum, where a variety of applications exist, and, still more preferably, from within the ultraviolet portion of the spectrum into the infrared portion of the spectrum, including the advantageous eye tolerant wavelength range of 1.5-1.8 microns.

In the illustrated implementation, the beam traverses the cell 112' five times before exiting through exit window 210 mounted in end cap 208. Again, the exit window 210 in the illustrated embodiment may be formed from fused silica and is disposed at a Brewster angle relative to the beam axis for optimum transmission. It will be appreciated that although a five pass geometry is shown, other folded path geometries may be used in the cell 112'.

Figure 3:
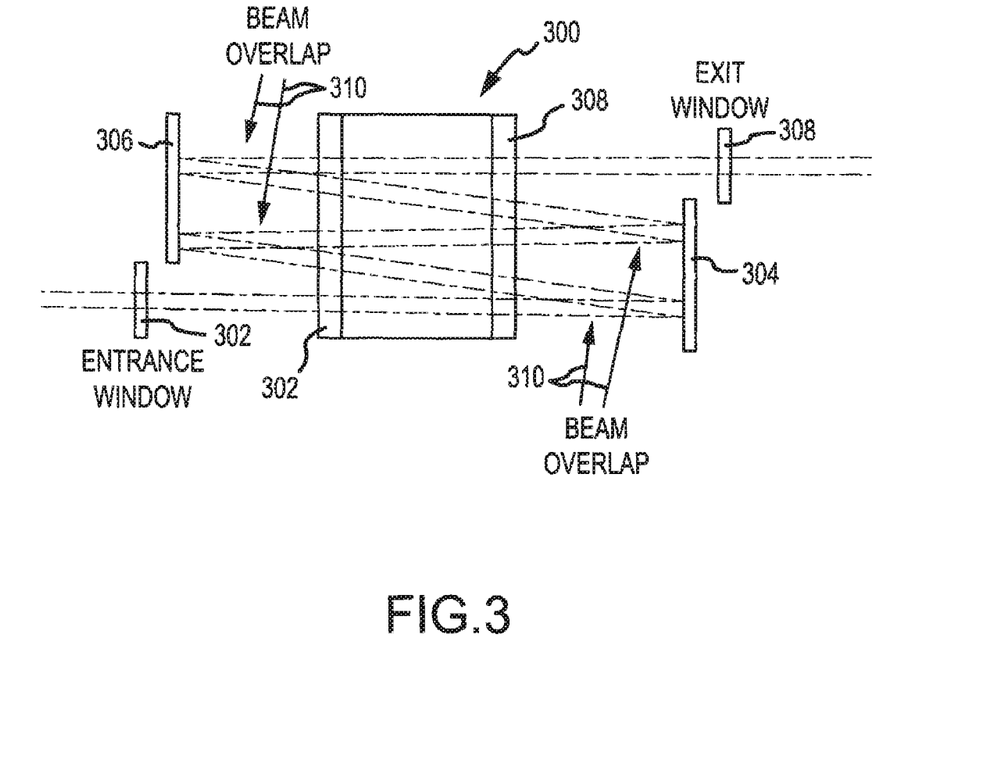
FIG. 3 is an alternative embodiment of a Raman cell for use in the system of FIG. 1.

A number of alternative implementations for the Raman cell with non-overlapping paths are possible in accordance with the present invention. One such alternative implementation, involving mirrors disposed external to the gas cell, is schematically illustrated in FIG. 3. The illustrated cell 300 includes an entrance window 302 for allowing transmission of the source beam together with the seed beam into the interior space of the cell 300, a first external mirror 304 disposed outside of the cell 300, a second external mirror 306 disposed outside of the cell 300 opposite the first mirror 304 and an exit window 308 for allowing transmission of the wavelength shifted beam out of the interior space of the cell 300. The mirrors 304 and 306 are dimensioned and are angularly movable so as to allow for varying the number of passes of the beam through the cell. In this regard, the optical path may involve a single reflection from each of the mirrors 304 and 306 or multiple reflections off of each mirror 304 and 306. In this manner, the overall path length of the beam within the Raman cell 300 can be changed to achieve optimal wavelength conversion.

For an exemplary 1.543 micron application, the Raman cell may be defined by a cylinder having a 20 cm outside diameter. The windows 302 and 308 are 12.7 mm thick and have a diameter sufficient to accommodate all of the beam passes. The illustrated windows 302 and 308 are made of UV-grade fused silica, and have an anti-reflection coating at least for the 1.543 micron wavelength. As will be discussed below, for implementations where it is desired to transmit both the laser pump wavelength (e.g., of 1064 nm) and the eye-safe 1.543 micron wavelength, the windows 302 and 308 may have an anti-reflection coating for each of the noted wavelengths.

The illustrated mirrors 304 and 306 are held by a single independent frame (not shown) to prevent external impetuses from altering the optical path of the system. The mirrors 304 and 306 have a high reflectivity coating for the 1.543 micron wavelength (and optionally also for the 1064 nm wavelength) at 0 degrees angle of incidence. They also feature high transmission at the second Stokes line (2.8 micron) and the first anti-Stokes line (0.81 micron) to suppress shifting to these wavelengths. The total exterior length of the cell is 75 cm and the distance between the mirrors is sufficiently greater than 75 cm (depending on the specific geometry employed) to avoid beam overlap within the cell. For enhanced wavelength shifting and reduced sooting for methane implementations, it is desirable to circulate the methane gas in the cell. Although not shown, an electrical feed-through in the illustrated cell drives an array of a 24 volts DC axial fans inside the cell to circulate the methane. In this manner, the gas heated by preceding laser pulses is cleared out of the beam path.

The mirrors 304 and 306 are mounted on gimbals to allow for the noted adjustment varying pass number operation of the cell without adjusting other mirrors in the transmit path. In this regard, the mirrors may be adjusted to allow an optical path within the cell having, for example, three, five, or seven segments relative to the length of the cell.

Although the illustrated cell 300 has been utilized to provide good results, certain operational difficulties and optical inefficiencies have been noted. First, the windows 302 and 308 are anti-reflection (AR) coated to prevent losses each time the beam passes through a window and the mirrors are high-reflection (HR) coated. The AR and HR coatings are problematic for two reasons: (1) they can be damaged from the intense laser light and (2) the AR coatings chemically react with gases such as methane in the presence of intense laser light. In this regard, it has been found necessary to replace the windows 302 and 308 and mirrors 304 and 306 periodically due to coating burns and significant scattering losses have been observed where the AR coating has been etched away. Moreover, if the overlap 310 extends into the cell, it may result in reduced conversion efficiency due to a reduction in the total volume of gas illuminated.

The present invention may be used to generate a 1.534 micron beam for an eye-safe lidar system as described in U.S. patent application Ser. No. 10/804,863, which is incorporated herein by reference.

There are a few choices for generating pulsed light in the 1.5 micron wavelength region. Solid state methods include optical parametric oscillators (OPOs), solid state resonators employing Er:glass or Cr$^{4+}$:YAG, and stimulated Raman scattering (SRS). The embodiments described in detail below employ SRS for several reasons including robustness of technique, the quality of the resulting beams including low divergence at the desired power for direct-detection lidar and cost effectiveness.

Figure 4:
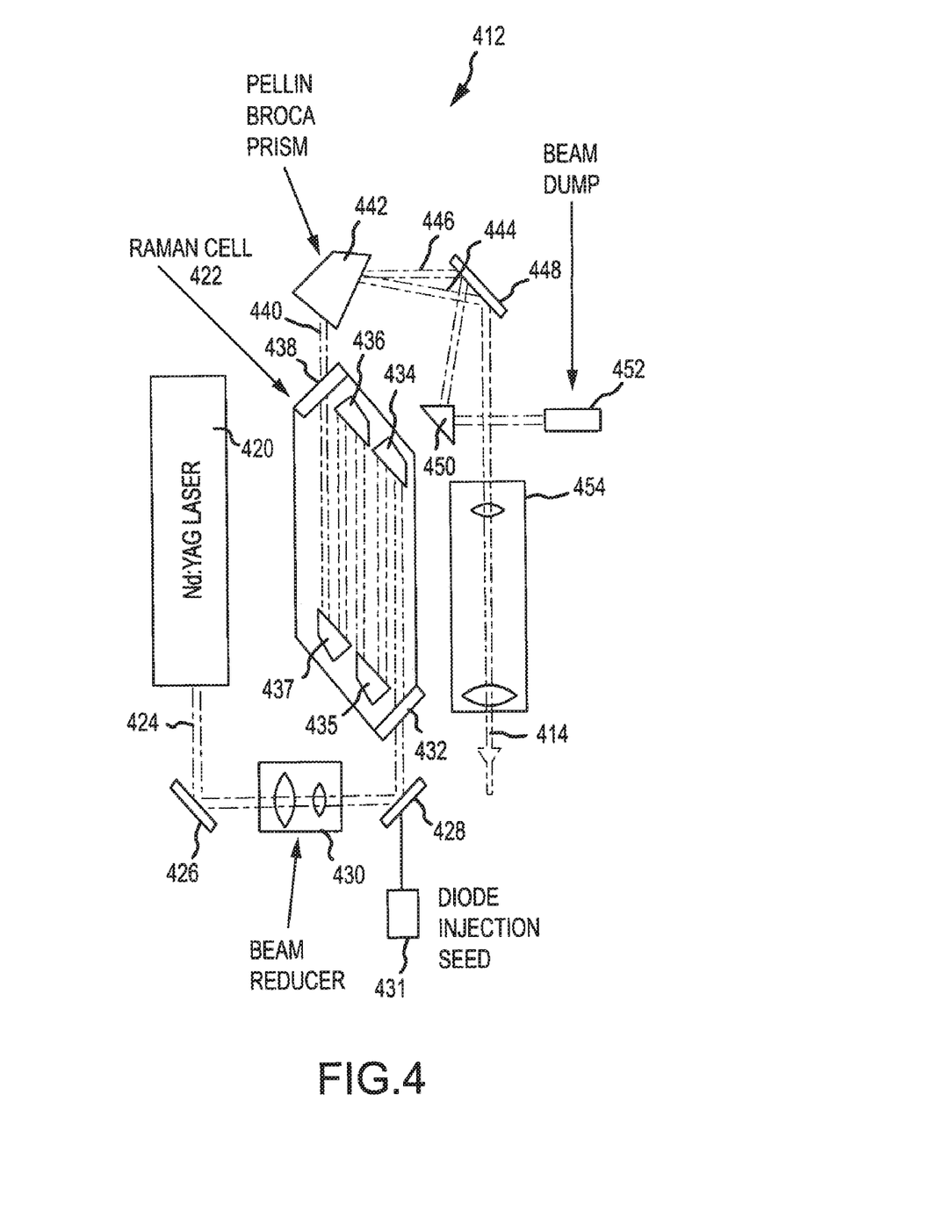
FIG. 4 is a top view of an embodiment of the system of FIG. 1.

FIG. 4 is a schematic diagram of a transmitter for a Raman-shifted eye-safe aerosol lidar (REAL) system constructed in accordance with the present invention. The REAL system generally includes a transmitter 412 for transmitting a low divergence, eye-safe beam 414 into the atmosphere and a receiver (not shown) for receiving backscattered radiation associated with the transmitted beam 414.

The transmitter 412 includes, among other things, a source pump laser 420 and a Raman cell 422. As discussed above, beams having desired characteristics within the desired wavelength range can be provided by using certain available pump lasers and then converting the source beam to the desired wavelength range using Raman techniques. In the illustrated embodiment, the pump laser 420 is a flash-lamp pulsed, Q-switched, Nd:YAG laser capable of generating 800 mJ/pulse energy at 1064 nm wavelength. Such a pump laser is marketed under the name Continuum Surelite III. The pump laser 420 produces a flat-topped multiple transverse mode beam with pulses 6 ns full-width half-max (FWHM) in duration. The beam 424 exiting the pump laser 420 is approximately 9 mm in diameter with a divergence of 0.6 mrad. The beam 424 is directed to the Raman cell 422 by way of folding mirrors 426 and 428. As will be discussed below, folding mirror 428 has coating properties so as to allow for transmission of a seed beam through the mirror 428 for coaxial alignment of the seed beam and source beam 424.

The Raman cell 422 is a methane Raman cell that operates to convert the source beam 424 having a wavelength of 1064 nm to a first Stokes wavelength of 1.543 microns within the desired range for eye-safety. A principle disadvantage of such Raman cells as heretofore constructed is that the focused beams used in such applications resulted in substantial degradation or sooting of the methane which in turn degrades the optical properties of the system. In order to minimize such sooting, while providing a beam of sufficient optical density for enhanced wavelength conversion, the illustrated transmitter 412 employs a beam reducer 430. The illustrated beam reducer 340 is provided via a small Galilean telescope.

In the illustrated embodiment, the pump beam is converted to the eye-safe wavelength via stimulated Raman scattering (SRS) in a pressurized cell filled with pure CH$_4$. SRS is a third-order, nonlinear, inelastic scattering process whereby a sufficiently-high pump field excites molecular vibrations in a medium. The frequency of the scattered light (Stokes output) is shifted by the frequency of these vibrations. Assuming the pump is not depleted, the Stokes intensity as a function of distance is given by the equation $$I_s(z) = I_s(0)e^{g_R I_p z} \quad (1)$$

in which $I_s(0)$ is the initial Stokes intensity, $g_R$ is the steady state Raman gain coefficient, $I_p$ is the pump intensity, and z is the interaction length. The gain coefficient is a function of the Raman active medium and its pressure.

The nth Stokes $\lambda_n^S$, and anti-Stokes, $\lambda_n^{AS}$, wavelengths are given by $$\lambda_n^S = \left(\frac{1}{\lambda_p} - \frac{n}{\lambda_R}\right)^{-1} \text{ and } \lambda_n^{AS} = \left(\frac{1}{\lambda_p} - \frac{n}{\lambda_R}\right)^{-1} \quad (2)$$

respectively, where $\lambda_p$ is the pump wavelength, and $\lambda_R$ is the wavelength of the Raman transition. The wavelength of the Raman active symmetric stretch of CH$_4$ is 3.428 µm. Pumping with 1064 nm results in a 1$^{st}$ Stokes wavelength of 1543 nm, 2$^{nd}$ Stokes wavelength of 2.808 µm and a 1$^{st}$ anti-Stokes wavelength of 0.812 µm. As discussed below, the Raman cell may be designed to suppress the buildup of the 2$^{nd}$ Stokes and 1$^{st}$ anti-Stokes wavelengths.

As seen in Equation 1, the Stokes intensity is a function of pump intensity, pressure of the gas, interaction path length, and the initial Stokes intensity. Typically, the Stokes field is initiated by the spontaneous emission of a photon and therefore the energy and spatial characteristics will fluctuate. To avoid these fluctuations the illustrated cell 422 is seeded with a stable tunable Stokes wavelength laser 431. The illustrated laser 431 may be, for example, a continuous-wave 20 mW telecom diode laser (Mitsubishi FU-68PDF/520M45B). The illustrated laser 431 has a center wavelength of 1543.73 nm and approximately 3 nm tuneability. It is coupled to a single mode, polarization maintaining, fiber which emits a near perfect Gaussian beam. The laser diode driver and associated stable temperature controller (Wavelength Electronics, WLD3343 and WTC3243; respectively) are mounted on a custom circuit board (not shown). The laser 431 can be either current or temperature tuned to match the Stokes emission line. To ease alignment, the diode output is amplified via a 1 W fiber amplifier (IPG Photonics Corp., model EAU-1-C) to 100 mW; however, the additional power provides little to no performance enhancement. The output from the laser fiber is expanded and collimated to match the pump beam diameter, 6 mm, and spatially overlapped by transmitting through the back of the mirror 428, which, in the illustrated implementation, is a gimbal mounted turning mirror.

The source pump laser beam is reduced in diameter from the 9 nm source beam to a 6 mm diameter beam by beam compressor, which may be in the form of a Galilean telescope. The Galilean telescope is composed of two 25.4 mm diameter lenses; one piano-convex and one piano-concave, separated by 12 cm. In particular, the plano-convex lens may be a commercially available lens marketed under the name CVI Part No. PLCX-25.4-180.3-UV-1064 and the piano concave lens may be a commercially available lens marketed under the name CVI Part No. PLCC-25.4-128.8-UV-1064. When this geometry is employed, the resulting beam is substantially collimated rather than focused. That is, the rays of the beam are substantially parallel rather than converging relative to any of the optics of Raman cell 422. It is further noted that the pairing of the folding mirrors 426 and 428 allows for improved circularity of the beam entering the Raman unit 422.

It has been found that optical performance can be improved by altering the optical geometry such that the beam converges slightly while passing through the Raman cell. That is, the beam is free from any beam waist within the Raman cell, but has a slightly greater energy density at the exit window from the cell than at the entry window. This is shown in the optical schematic diagram of FIG. 6, where such convergence is exaggerated and the system geometry somewhat simplified for purposes of illustration. The illustrated system 600 includes a source 602, optics 604 and a Raman cell 606 including an entry window 608 and an exit window 610. Each of these components may be as described above where the optics 604 corresponds to the beam reducer 430 of FIG. 4. Although not shown, the seed source and various folding optics as described above may be employed. In addition, a multipass optical path through the Raman cell 606 may be employed as discussed above.

Figure 6:
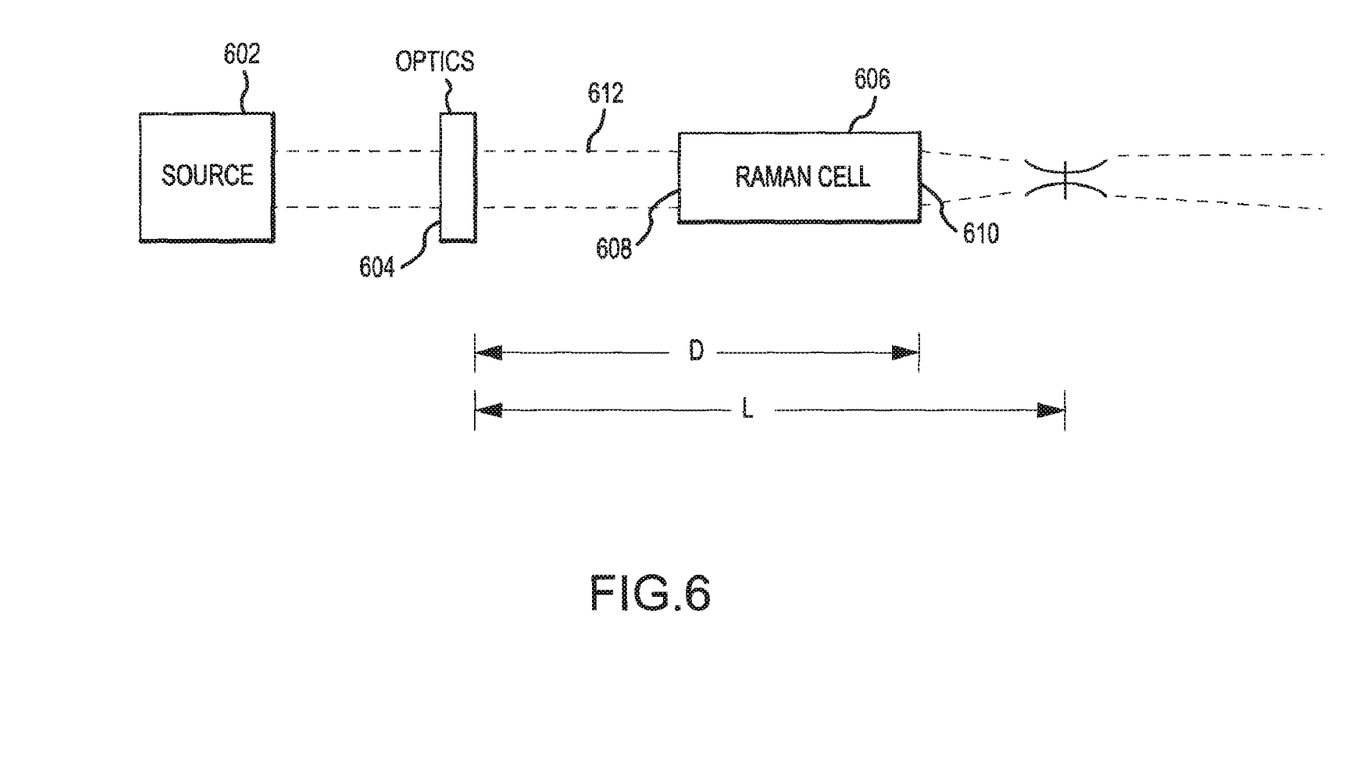
FIG. 6 is a schematic diagram showing transmission of a converging beam through the Raman cell in accordance with the present invention.

As shown, the optics form the beam 612 such that the beam 612 does not have a waist within the cell 606. Rather, the beam 612 is nearly collimated, but converges slightly across the cell 606. As a result, the optical energy density at the exit window is greater than at the entry window. The illustrated optics thus have an effective focal length, L, measured from the optics 604 to a focal spot or beam waist of beam 612 that is greater than the distance, D (measured along the optical path of the beam 612 which may be folded), from the optics 604 to the exit window 610, but less than infinity. Using such a converging optical geometry has been found to provide improved Raman cell optical conversion efficiency in relation to a collimated geometry with other factors remaining unchanged. Thus, in the system of FIG. 4 with a collimated beam, a conversion efficiency of about 30% was realized whereas, in the same system with a converging beam, a conversion efficiency of about 37% has been obtained.

The illustrated Raman cell 422 includes a number of enhancements for improved optical efficiency. The illustrated cell 422 includes an entrance window 432, internal reflectance elements 434-437 and an exit window 438. The entrance and exit windows 432 and 438 are oriented at the Brewster angle with respect to the incident beam to eliminate the need for the vulnerable AR coatings. The Brewster angle is the angle at which light, in a particular linear polarization state, will pass through an interface without any reflection. The internal reflectance elements 434-437 provide for internal rather than surface reflection of the beams. For example, the elements 434-437 may be prisms. The elements 434-437 thus redirect the light based on total internal reflections thereby eliminating the need for special HR coatings. In addition to having a higher damage threshold, the total internal reflection has negligible loss whereas the HR coatings may leak up to 5% of the pulse energy at each reflection. The elements 434-437 are also oriented at Brewster angles relative to the incident beams to eliminate the need for AR coatings on their front entrance and exit surface. Moreover, the use of the internal reflectance elements 434-437 eliminates the beam overlap geometry associated with surface reflecting mirrors. That is, by translating the beam within the elements 434-437 and then maintaining the beams in a parallel relationship within the cell 422, a larger volume of gas is illuminated for higher total gain while requiring slightly less total volume in the cell 422. The windows 432 and 438 and internal reflectance elements 434-437 may be made of, for example, infrared grade fused silica so that they can be used at any wavelength from the ultraviolet to the near infrared. The elimination of the AR and HR coatings means the illustrated cell 422 can be used at various wavelengths and will be more durable. The higher order Stokes and anti-Stokes lines can be suppressed by other means, e.g., by controlling cell gas pressure and by injection seeding.

Although the Raman cell 422 is described as part of a REAL system, it is anticipated that the cell 422 will have utility in a variety of applications. For example, it is anticipated that the cell 422 will allow for an eye-safe water vapor DIAL at approximately a 1.5 micron wavelength. In this regard, such a DIAL may utilize an 800-900 nm pump and relatively low pressure hydrogen. The pump beam would be shifted to 1200-1570 nm via first Stokes stimulated Raman scattering. There are many water vapor absorption lines in this vicinity. It is noted in this regard that hydrogen is a higher gain medium than methane and it is therefore anticipated that only 1-2 atm of pressure would be required compared to the approximately 10-13 atm of methane that are currently used in the illustrated application. Lower gas pressure is generally safer and it is further noted that the higher Stokes and anti-Stokes lines are suppressed at such low pressure configurations.

The illustrated Raman cell may provide enhanced performance for certain aerosol backscatter lidar applications. In particular, the illustrated transmitter 412 operates at 10 Hz using a laser pump 420 with 800 mJ/pulse to produce about 200 mJ/pulse at the eye-safe wavelength of 1.543 microns. By comparison, the Scanning Aerosol Backscatter Lidar (SABL) available from the National Center for Atmospheric Research (NCAR) provides a single shot energy for each pulse that is several times lower than the illustrated system. However, the pulse repetition frequency of the illustrated system is approximately six times less than that of the SABL. For scanning applications, high pulse repetition frequency is very important because it translates directly to the angular resolution of the scan data. Thus, the illustrated cell 422 could alternatively be used with an alternative pump laser running at 50-100 Hz with 1.2 J/pulse for an eye-safe aerosol lidar with unprecedented spatial resolution and range. The illustrated cell 422 accommodates such operation because the windows 432 and 438 and internal reflectance elements 434-437 do not require fragile coatings that may not survive the more intense energy of the higher pulse repetition frequency pump.

The illustrated Raman cell 422 may also be pumped with a wavelength tripled commercially available Nd:YAG to produce multiple wavelengths in the ultraviolet range for an ozone DIAL.

Figure 5:
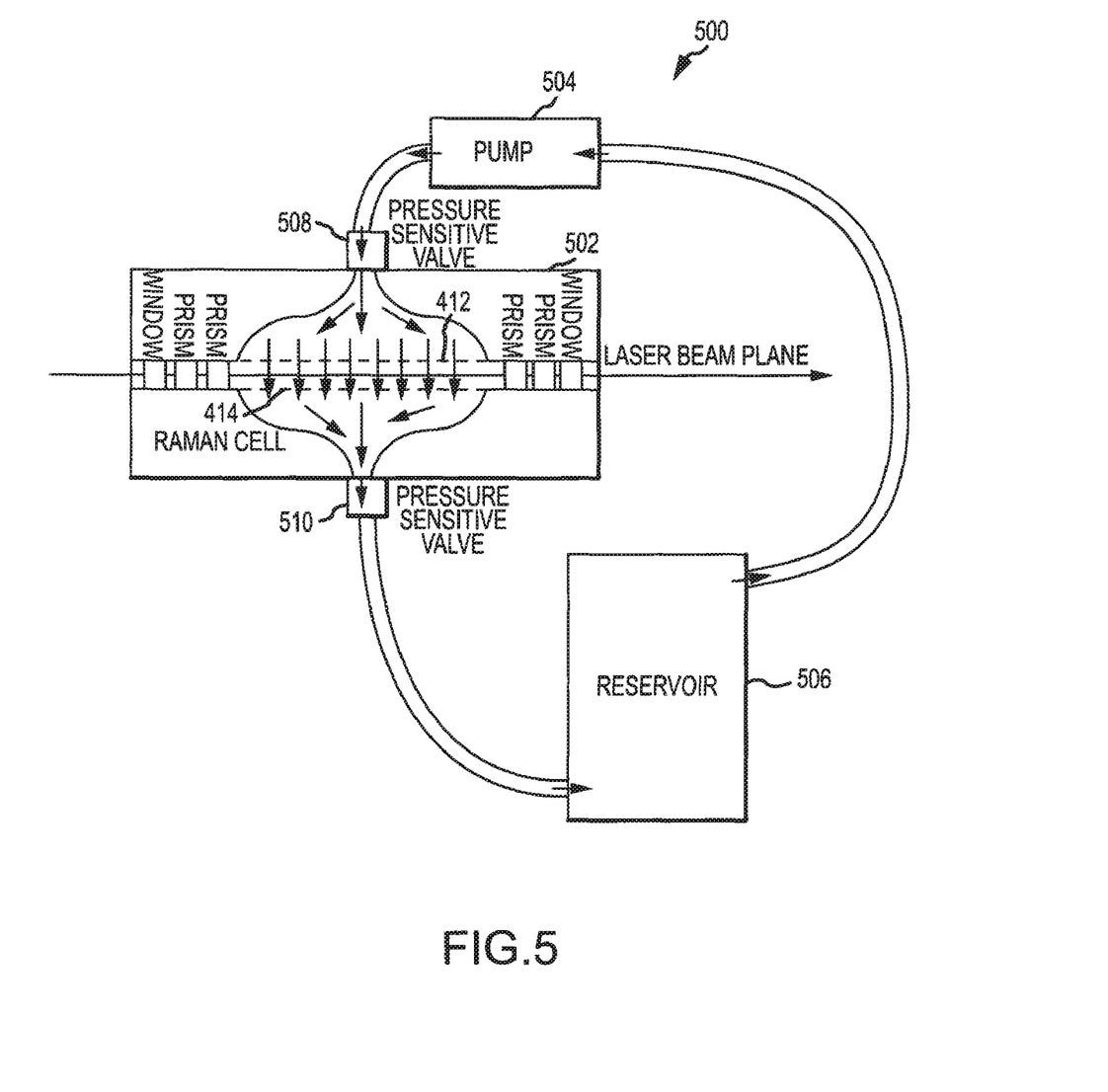
FIG. 5 is a schematic illustration of a further alternative embodiment of a Raman cell for use in the system of FIG. 1.

As noted above, it is desirable to circulate the gas, e.g., methane, in the Raman cell so as to avoid illuminating gas that remains heated from a preceding laser pulse. FIG. 5 illustrates a gas circulation system for circulating a Raman cell gas such as methane. The Raman cell including internal prisms and windows is schematically illustrated at 502. The circulation system 500 is used to safely circulate methane. An important objective is to have the smallest volume of methane possible in the cell where the laser beam is transmitted. This is because it is desired to minimize (1) the amount of potential energy due to compression and (2) the volume of methane that could mix with air and be flammable if a window cracked or there was otherwise a leak. The illustrated system 400 also eliminates mechanical fans inside the Raman cell. This eliminates the need for electrical feed-throughs and greatly reduces the chances of contaminating the inside of the cell due to oils or outgassing of fan material. Moreover, it eliminates the need to open the Raman cell to replace a fan if one developed a problem.

In the illustrated system 500, to circulate the methane, an external pump 504 drives the methane flow in a loop. The pump 504 draws methane from a reservoir 506 and drives it through the cell 502. Pressure sensitive valves 508 and 510 on the Raman cell 502 isolate the rest of the system if a leak were to occur in the Raman cell 502. The methane flow space through the cell 502 may be configured for improved laminarity of flow at the location of illumination. Additionally, flow grates 512 and 514 may be disposed on opposite sides of the illumination area for improved laminarity and one directional flow.

Referring again to FIG. 4, the beam 440 exiting the Raman cell 422 generally includes two wavelength components. Specifically, not all of the optical energy is converted from the source laser pump wavelength to the Raman shifted, eye-safe wavelength. It is often desired to transmit only the eye-safe wavelength into the atmosphere. Accordingly, it may be desired to remove the source laser pump wavelength component. In the illustrated embodiment, a wavelength dispersive element 442, such as a Pellin Broca prism, receives the beam 440 and spatially separates the beam 440 into an eye-safe beam 444 and a source wavelength beam 446. The path of the source wavelength beam 446 is folded by mirror 448 and prism 450 to a beam dump component 452. For example, the beam dump component 452 may be a black box or other light absorber.

The eye-safe beam 444 is further processed for transmission into the atmosphere. Specifically, in the illustrated embodiment, the eye-safe beam 444 is processed by a beam expander 454 to impart desired beam characteristics. In this regard, it is desirable to expand the eye-safe beam 444 to provide the desired optical density as well as to improve the beam divergence.

The divergence of a laser beam is given by:

$$\Theta = M^2 \frac{2\lambda}{\pi \omega_o} \quad (3)$$

where $\omega_o$ is the beam waist radius, $\lambda$ is the wavelength, and $M^2$ is defined as the ratio of the beam's divergence to that of a diffraction limited beam of the same waist diameter. Note from Equation 3 that the beam divergence can be reduced by improving the beam quality and/or increasing the beam diameter (beam expansion). The noted REAL system capitalizes on this Gaussian beam propagation concept in the transmitter design to reduce the divergence of the transmit beam to fit within the receiver's field of view. First, as noted above, the Raman cell is injection seeded to improve beam quality, and second, the beam is expanded prior to transmitting into the atmosphere.

In the illustrated transmitter, the eye-safe beam 444 is expanded by expander 454, for example, in the form of a Galilean telescope. Specifically, the illustrated expander 454 is a custom lens system including two air-spaced doublets each antireflection coated for the eye-safe wavelength of 1.543 microns (and optionally for dual wavelength operation as discussed below for 1064 nm). The first 25.4 mm diameter doublet is a negative lens with a focal length of 138 mm. The second 101.6 mm diameter doublet is a positive lens with a focal length of 574 mm. The doublets are separated by 438 cm and expand beam 4.3 times. The expanded Stokes beam (about 50 mm diameter) has a half angle divergence of 0.20× 0.24 mrad. The resulting expanded, low divergence eye-safe beam may be transmitted via a folded path into the atmosphere. Each such folding mirror may be coated for high reflection at the desired wavelength or wavelengths.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A Raman shifter, comprising:
a first port for admitting, into an interior of a cell, a source beam of radiation having a first nominal wavelength;
a wavelength shifting region interior of said cell containing a medium wherein radiation is shifted from said first nominal wavelength to a second nominal wavelength different than said first wavelength due to interaction of said source beam with said medium;
first folding optics for folding an optical path of said source beam across said wavelength shifting region of said cell substantially free from optical overlap, said folding optics being operative for receiving said beam via a first optical path portion, defined by a first width of said source beam on said first optical path portion and a first propagation axis of said first optical path portion, and redirecting said source beam on a second optical path portion, defined by a second width of said source beam on said second optical path portion and a propagation axis of said second optical path portion, each of said first and second optical path portions extending across at least a portion of said wavelength shifting region and traversing said medium, wherein said first optical path portion is substantially free from spatial overlap with said second optical path portion inside said wavelength shifting region, wherein said first folding optics includes an interface surface defining an interface with said medium, and said first folding optics is operative for redirecting said beam such that there is a spatial offset, between a first intersection of said first propagation axis with said interface surface and a second intersection of said second propagation axis with said interface surface, that is at least about equal to the sum of one-half of the first width and one-half of the second width; and
a pump source for transmitting said source beam, a seed source for transmitting a seed beam having a wavelength substantially equal to said second nominal wavelength and combining optics for combining said source beam and said seed beam for transmission into said cell via said first port.

2. A Raman shifter as set forth in claim 1, wherein said first port comprises a window disposed in a wall of said cell, wherein said window is substantially transparent with respect to said source beam.

3. A Raman shifter as set forth in claim 2, wherein said window includes a surface disposed at a Brewster angle relative to a propagation axis of said source beam.

4. A Raman shifter as set forth in claim 1, wherein said cell contains a pressurized gas and said wavelength shifting region is defined by an interior portion of said cell that contains said gas.

5. A Raman shifter as set forth in claim 1, wherein said interface surface is disposed substantially at a Brewster angle relative to at least one of said first and second propagation axes.

6. A Raman shifter as set forth in claim 1, wherein said redirecting optics includes structure, separated from said interface by a distance, for reflecting said source beam.

7. A Raman shifter as set forth in claim 6, wherein said distance is greater than a wavelength of said source beam.

8. A Raman shifter as set forth in claim 6, wherein said distance is greater than a width of said source beam.

9. A Raman shifter as set forth in claim 6, wherein said structure is operative for reflecting said source beam more than once.

10. A Raman shifter as set forth in claim 1, wherein said first folding optics is a solid state device.

11. A Raman shifter as set forth in claim 1, wherein said first folding optics comprises a prism.

12. A Raman shifter as set forth in claim 1, further comprising second folding optics, wherein said first and second folding optics define a multi-pass pathway of said source beam through said medium.

13. A Raman shifter as set forth in claim 1, further comprising an exit window, including a surface disposed at a Brewster angle relative to a propagation axis of said source beam incident on said surface, for allowing transmission of said source beam from said cell.

14. A Raman shifter as set forth in claim 1, further comprising beam processing optics for changing a diameter of at least one of said source beam and seed beam prior to combination thereof by said combining optics.

15. A Raman shifter as set forth in claim 1, further comprising filtering optics for removing a wavelength component from a beam transmitted from said cell.

16. A Raman shifter as set forth in claim 1, further comprising a source for transmitting said source beam and optics for forming said source beam such that said source beam has a first energy density at an exit port of said cell that is greater than a second energy density at an input port of said cell.

17. A method for use in providing a transmitter beam, comprising the steps of:
   providing a cell containing a medium for shifting a first source beam between a first wavelength and a second wavelength, wherein the first and second wavelengths differ by at least 100 nm;
   providing said first source beam and a second source beam, wherein the second source beam has a wavelength substantially equal to the second wavelength;
   combining said first source beam and said second source beam to form a combined beam; and
   passing said combined beam through said medium via first and second non-colinear path sections, free from any intervening path sections through said medium, wherein said first and second path sections are separated by at least a distance equal to about:
      one half a width of the first non-colinear path; and
      one half a width of the second non-colinear path.

18. A method as set forth in claim 17, wherein said step of passing comprises redirecting said beam using internal reflection optics.

19. A method as set forth in claim 17, wherein said cell comprises an entry window having an entry window surface, an exit window having an exit window surface and redirecting optics having a beam incidence surface, and said step of passing comprises disposing at least one of said entry window, exit window and beam incidence surfaces at a Brewster angle relative to a propagation axis of said source beam.

* * * * *